(12) United States Patent
Suzuki

(10) Patent No.: US 7,424,649 B2
(45) Date of Patent: Sep. 9, 2008

(54) LATCH AND PHASE SYNCHRONIZATION CIRCUIT USING SAME

(75) Inventor: Noriyuki Suzuki, Kanagawa-ken (JP)

(73) Assignee: Leader Electronics Corporation, Kanawaga-ken (JP)

( * ) Notice: Subject to any disclaimer, the term of this patent is extended or adjusted under 35 U.S.C. 154(b) by 624 days.

(21) Appl. No.: 10/989,055

(22) Filed: Nov. 16, 2004

(65) Prior Publication Data
US 2005/0216801 A1 Sep. 29, 2005

(30) Foreign Application Priority Data
Mar. 26, 2004 (JP) .................. 2004-092178

(51) Int. Cl.
*G06K 5/04* (2006.01)
(52) U.S. Cl. .................. 714/700; 714/724; 714/716
(58) Field of Classification Search .................. 714/700, 714/724, 726, 731; 327/144; 365/233
See application file for complete search history.

(56) References Cited

U.S. PATENT DOCUMENTS

| | | | | |
|---|---|---|---|---|
| 5,343,405 | A * | 8/1994 | Kucera et al. .................. | 702/73 |
| 5,519,714 | A * | 5/1996 | Nakamura et al. .......... | 714/726 |
| 5,651,013 | A * | 7/1997 | Iadanza ....................... | 714/731 |
| 6,075,416 | A | 6/2000 | Dalmia | |
| 6,127,864 | A * | 10/2000 | Mavis et al. ................. | 327/144 |
| 6,278,755 | B1 | 8/2001 | Baba et al. | |
| 6,446,229 | B1 * | 9/2002 | Merrick et al. ............... | 714/724 |
| 6,603,415 | B1 * | 8/2003 | Somayajula ................. | 341/118 |
| 6,606,360 | B1 | 8/2003 | Dunning et al. | |
| 7,215,596 | B2 * | 5/2007 | Jeong .......................... | 365/233 |
| 2002/0154043 | A1 | 10/2002 | Izawa et al. | |
| 2004/0160530 | A1 | 8/2004 | Suzuki | |

FOREIGN PATENT DOCUMENTS

JP     2004-254007     9/2004

OTHER PUBLICATIONS

European Search Report (Application No. EP 04 02 7167) dated Jun. 20, 2005; 3 pages.
European Office Action (Application No. 04027167.8) dated Jan. 19, 2006, 5 pages.
European Office Action (Application No. 04027167.8) dated Sep. 7, 2006, 3 pages.
European Office Action (Application No. 04027167.8) dated Sep. 3, 2007, 3 pages.

* cited by examiner

*Primary Examiner*—Jacques Louis-Jacques
*Assistant Examiner*—Fritz Alphonse
(74) *Attorney, Agent, or Firm*—Fish & Richardson P.C.

(57) ABSTRACT

A latch is provided for rapidly stabilizing a latching operation. The latch comprises a first latch circuit for latching a first signal in response to a first portion of a second signal to generate a first latch signal, and a latch error compensator for compensating a latch error in the first latch signal generated by the first latch circuit to generate a compensated latch signal.

8 Claims, 14 Drawing Sheets

FIG. 4

| SYSTEM | FORMAT | DIGITAL VIDEO CLOCK FREQUENCY | NUMBER OF DOTS PER FRAME |
|---|---|---|---|
| HD-SDI | 1920 × 1080i/60 | 74.25M | 2475000 |
| | 1920 × 1080i/59.94 | 74.1758241758242M | 2475000 |
| | 1920 × 1080i/50 | 74.25M | 2970000 |
| | 1920 × 1080psF/30 | 74.25M | 2475000 |
| | 1920 × 1080psF/29.97 | 74.1758241758242M | 2475000 |
| | 1920 × 1080psF/25 | 74.25M | 2970000 |
| | 1920 × 1080psF/24 | 74.25M | 3093750 |
| | 1920 × 1080psF/23.98 | 74.1758241758242M | 3093750 |
| | 1920 × 1035i/60 | 74.25M | 2475000 |
| | 1920 × 1035i/59.94 | 74.1758241758242M | 2475000 |
| | 1920 × 1080p/30 | 74.25M | 2475000 |
| | 1920 × 1080p/29.97 | 74.1758241758242M | 2475000 |
| | 1920 × 1080p/25 | 74.25M | 2970000 |
| | 1920 × 1080p/24 | 74.25M | 3093750 |
| | 1920 × 1080p/23.98 | 74.1758241758242M | 3093750 |
| | 1280 × 720p/60 | 74.25M | 1237500 |
| | 1280 × 720i/59.94 | 74.1758241758242M | 1237500 |
| | 1280 × 720p/50 | 74.25M | 1485000 |
| | 1280 × 720p/30/1:1 | 74.25M | 2475000 |
| | 1280 × 720p/29.97/1:1 | 74.1758241758242M | 2475000 |
| | 1280 × 720p/25/1:1 | 74.25M | 2970000 |
| | 1280 × 720p/24 | 74.25M | 3093750 |
| | 1280 × 720p/23.98 | 74.1758241758242M | 3093750 |
| SD-SDI | 525/59.94i | 13.5M | 450450 |
| | 625/50i | 13.5M | 540000 |

FIG. 9

DECODER TRUTH TABLE

| | LATCH ERROR SIGNAL LER1 | LATCH ERROR SIGNAL LER2 | SELECTION SIGNAL SEL |
|---|---|---|---|
| (1) | LOW | LOW | = |
| (2) | LOW | HI | LOW |
| (3) | HI | LOW | HI |
| (4) | HI | HI | = |

LER1,2
Low: LATCH ERROR DETECTED
HI: LATCH ERROR NOT DETECTED

SEL
Low: SELECT SECONDARY LATCH OUTPUT
HI: SELECT PRIMARY LATCH OUTPUT
=: SAME AS PREVIOUS SELECTION

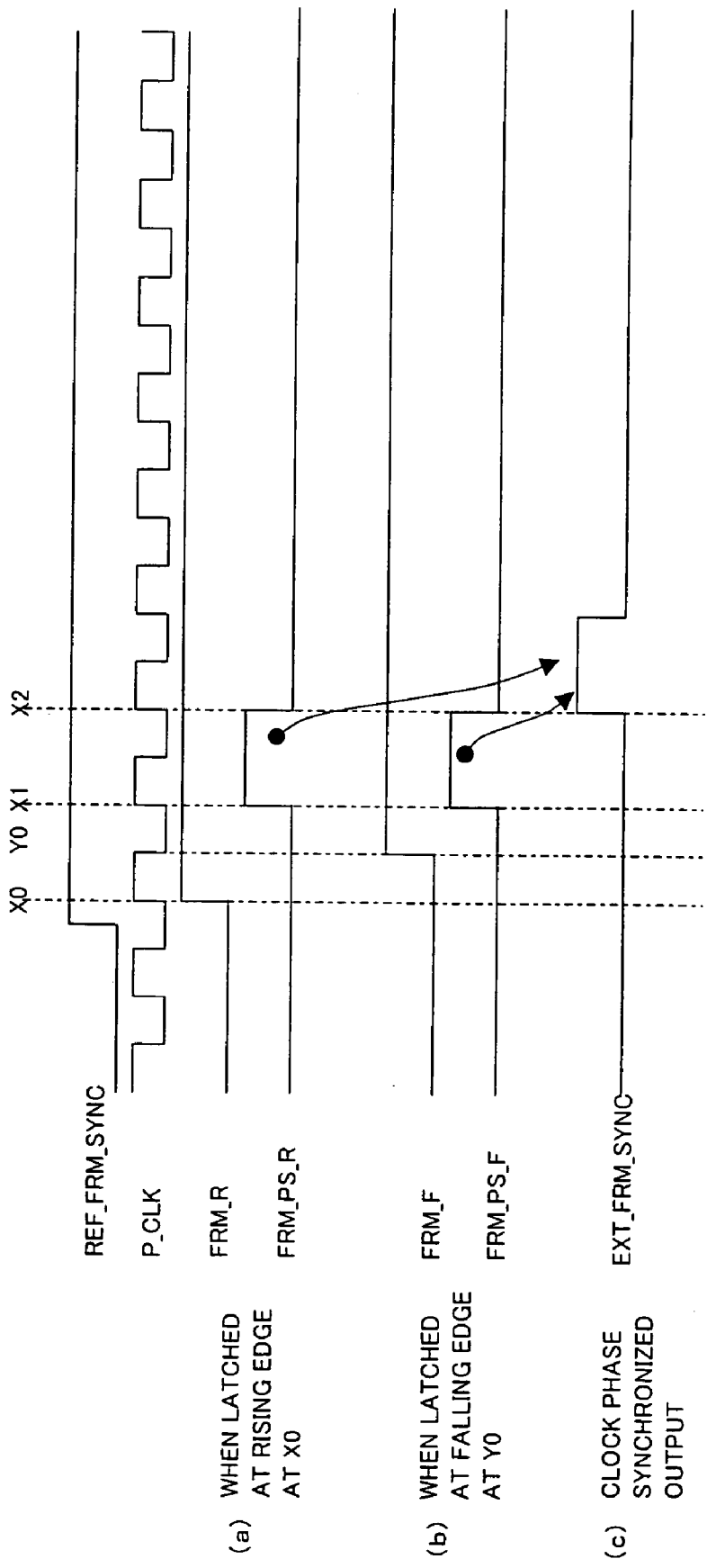

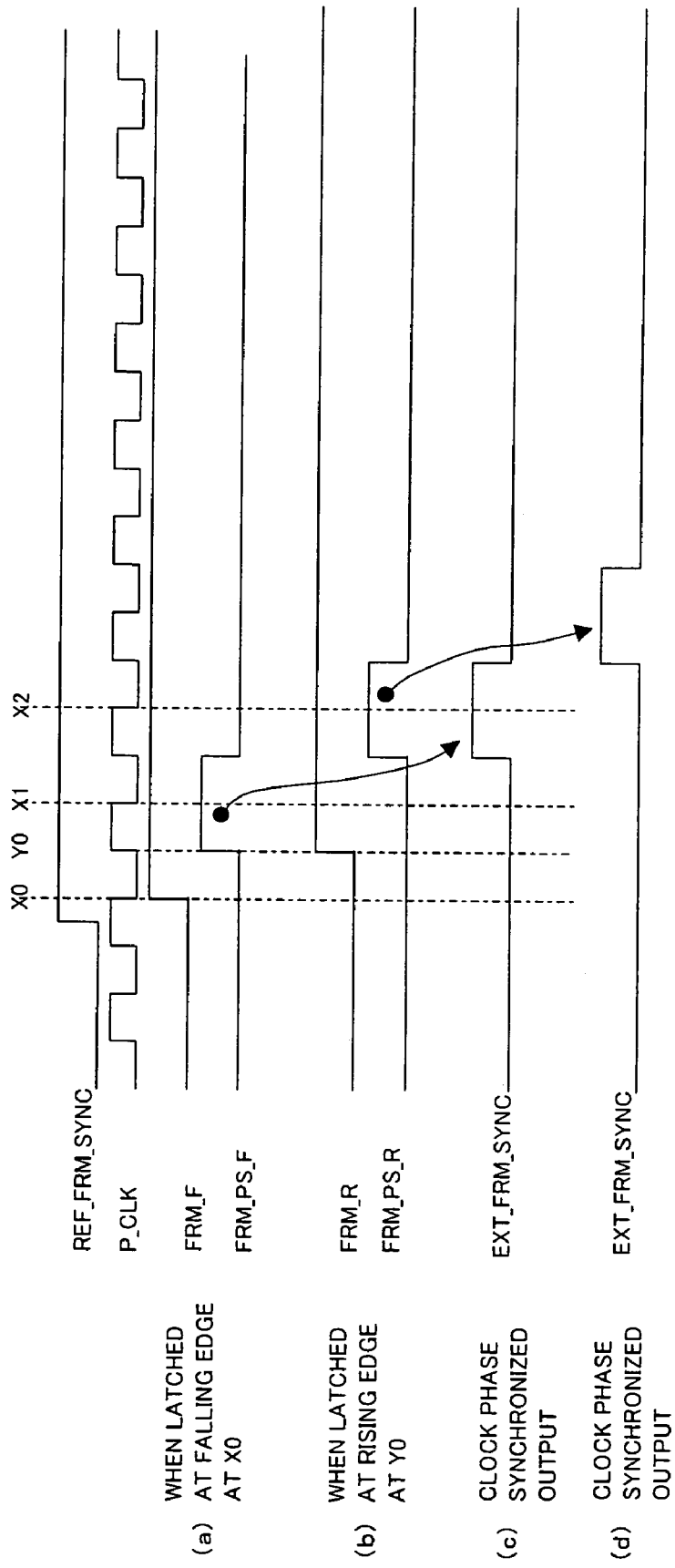

DECODER TRUTH TABLE

| DEFAULT | LER1 | LER2 | SEL |
|---------|------|------|-----|
| HI | LOW | LOW | HI |
| | LOW | HI | HI |
| | HI | LOW | HI |
| | HI | HI | HI |
| LOW | LOW | LOW | = |
| | LOW | HI | LOW |
| | HI | LOW | HI |
| | HI | HI | = |

LATCH AND PHASE SYNCHRONIZATION CIRCUIT USING SAME

BACKGROUND OF THE INVENTION

The present invention relates to a latch and a phase synchronization circuit using the same.

Conventionally, for establishing phase synchronization of a television signal, for example, a serial digital interface (SDI) signal to an external reference signal, a jitter detector circuit is incorporated in a conventional waveform monitor. This jitter detector circuit is described in the specification of Japanese Patent Application No. 2003-41273 which is an earlier application filed by the assignee of the present application. The jitter detector circuit is used to establish phase synchronization of an SDI signal to an external reference signal, for example, an external reference frame synchronization signal in phase. More specifically, the jitter detector circuit comprises a latch for generating a frame sync signal based on the external reference frame sync signal. The latch latches the external frame sync signal derived from the external reference frame sync signal in response to a parallel clock derived from the SDI signal. A difference in phase between the external frame sync signal and parallel clock, which can be caused by an erroneous operation of the latch, i.e., an operation in an unstable region presented by the latch, is detected by the jitter detector circuit as jitter. Then, the external frame sync signal is delayed in a direction in which the phase jitter is reduced between the external frame sync signal and parallel clock. In this way, the finally established external frame sync signal is in phase sync to the parallel clock.

The jitter detector circuit described above employs a feedback control for delaying the external frame sync signal in a direction in which jitter is canceled. In addition, delay elements are used in the feedback loop. Therefore, each time jitter is detected, a feedback operation is involved for the phase synchronization. Further, the feedback control can cause a certain delay in the phase synchronization.

SUMMARY OF THE INVENTION

According to one aspect of the invention, a latching method is provided which comprises the steps of: latching a first signal in response to a first portion of a second signal to generate a first latch signal, and compensating the first latch signal for a latch error to generate a compensated latch signal.

According to another aspect of the present invention, the step of compensating may include latching the first signal in response to a second portion of the second signal to generate a second latch signal, and selecting one of the first and second latch signals as the compensated latch signal. The step of selecting may include detecting a latching position error in each of the first and second latch signals to generate a latch error signal, and selecting one of the first and second latch signals based on the latch error signal.

According to another aspect of the present invention, the step of detecting may include detecting a latch error in the first latch signal to generate a first latch error signal, and detecting a latch error in the second latch signal to generate a second latch error signal. Also, each of said step of detecting a latch error in said first latch signal and said step of detecting a latch error in said second latch signal may include receiving an associated latch signal from among the first and second latch signals and the second signal to generate a latch state signal indicative of the length from a predetermined reference position of the second signal to the latching position of the associated latch signal; and comparing the latch state signal for a first periodic portion of the first signal with the latch state signal for a second periodic portion adjacent to the first periodic portion of the first signal, to generate a latch error signal in the associated latch signal in accordance with a result of the comparison.

According to another aspect of the present invention, the step of selecting one of said first and second latch signals based on said latch error signal may include receiving a first said latch error signal associated with the first latch signal and a second said latch error signal associated with the second latch signal to generate a selection signal indicative of a selection of one of the first and second latch signals based on the first latch error signal and the second latch error signal, and outputting one of the first and second latch signals based on the selection signal.

According to a further aspect of the present invention, a phase synchronizing method is provided which comprises a latching method mentioned above for establishing phase synchronization of the first signal to the second signal.

Further, according to a further aspect of the present invention, a latch is provided which comprises a first latch circuit that latches a first signal in response to a first portion of a second signal to generate a first latch signal, and a latch error compensator that compensates the first latch signal of the first latch circuit for a latch error to generate a compensated latch signal.

According to another aspect of the present invention, the latch error compensator may include a second latch circuit that latches the first signal in response to a second portion of the second signal to generate a second latch signal, and a selector circuit that receives the first and second latch signals and selects one of the first and second latch signals as the compensated latch signal.

According to another aspect of the present invention, the selector circuit may include a latch error detector that detects a latching position error in each of the first latch signal and the second latch signal to generate a latch error signal, and an optimal output selector circuit that selects one of the first latch signal and the second latch signal based on the latch error signal. The latch error detector may include a first latch error detector that detects a latch error in the first latch signal to generate a first latch error signal, and a second latch error detector that detects a latch error in the second latch signal to generate a second latch error signal. Each of the first and second latch error detectors may include a latch state detector that receives an associated latch signal from among the first and second latch signals and the second signal and generates a latch state signal indicative of the length from a predetermined reference position of the second signal to the latching position of the associated latch signal, and a latch state comparator that compares the latch state signal for a first periodic portion of the first signal with the latch state signal for a second periodic portion adjacent to the first periodic portion of the first signal to generate a latch error signal in the associated latch signal in accordance with a result of the comparison.

According to another aspect of the present invention, the latch state detector may include a timing generator that receives the associated latch signal to generate a latch state detecting period signal for detecting the latch state, and a reference clock generator that receives the second signal to generate the number of reference clocks occurring from the predetermined reference position of the second signal, and wherein the latch state detector may generate a latch state signal indicative of the number of the reference clocks in the one latch state detecting period for one periodic portion of the first signal.

According to another aspect of the present invention, the latch state comparator, in turn, may include a comparator that receives a first said latch state signal for a first said periodic portion of the first signal, and a second said latch state signal for a second said periodic portion adjacent to the first periodic portion of the first signal and compares the first and second latch state signals with each other to generate the latch error signal.

According to another aspect of the present invention, the optimal output selector circuit may include an optimal output decision circuit that receives a first said latch error signal from the first latch error detector and a second said latch error signal from the second error detector and generates a selection signal indicative of a selection of one of the first and second latch signals based on the first and second latch error signals, and a selector that output one of the first and second latch signals as the compensated latch signal based on the selection signal.

According to a further aspect of the present invention, a phase synchronization circuit is provided which comprises the latch described above for establishing phase synchronization of the first signal to the second signal.

According to the present invention, the provision of two latch circuits can eliminate a feedback circuit. With the elimination of the feedback circuit, a latching operation can be more rapidly stabilized. Further, with the elimination of the feedback circuit, any delay element can be made unnecessary, resulting in a simplified circuit configuration.

These and other objects and advantages of the present invention will become more apparent from the following description of the illustrative embodiments.

BRIEF DESCRIPTION OF THE DRAWINGS

FIG. 4 is a table showing the relationship among a variety of formats of television signals, digital video clock frequencies thereof, and the number of dots per frame with respect to an HD-SDI signal and an SD-SDI signal;

FIG. 9 shows a truth table for decoding logic of a decoder shown in FIG. 3;

FIG. 10 is a timing diagram illustrating the operation of the phase synchronization circuit of FIG. 3 when an edge of a reference frame synchronization signal REF_FRM_SYNC exists between a falling edge and a rising edge of a parallel clock P_CLK without any latch error either in the primary latch or in the secondary latch of FIG. 3;

FIG. 11 is a timing diagram illustrating the operation of the phase synchronization circuit of FIG. 3 when an edge of the reference frame synchronization signal REF_FRM_SYNC exists between a rising edge and a falling edge of the parallel clock P_CLK without any latch error either in the primary latch or in the secondary latch of FIG. 3;

DETAILED DESCRIPTION OF THE INVENTION

In the following, several embodiments of the present invention will be described in detail with reference to the accompanying drawings. The disclosure of Japanese Patent application No. 2004-092178 entitled "Latch And Phase Synchronization Circuit Using Same" and filed Mar. 26, 2004 including specification, drawings and claims is incorporated herein by reference in its entirety.

Figure 1:
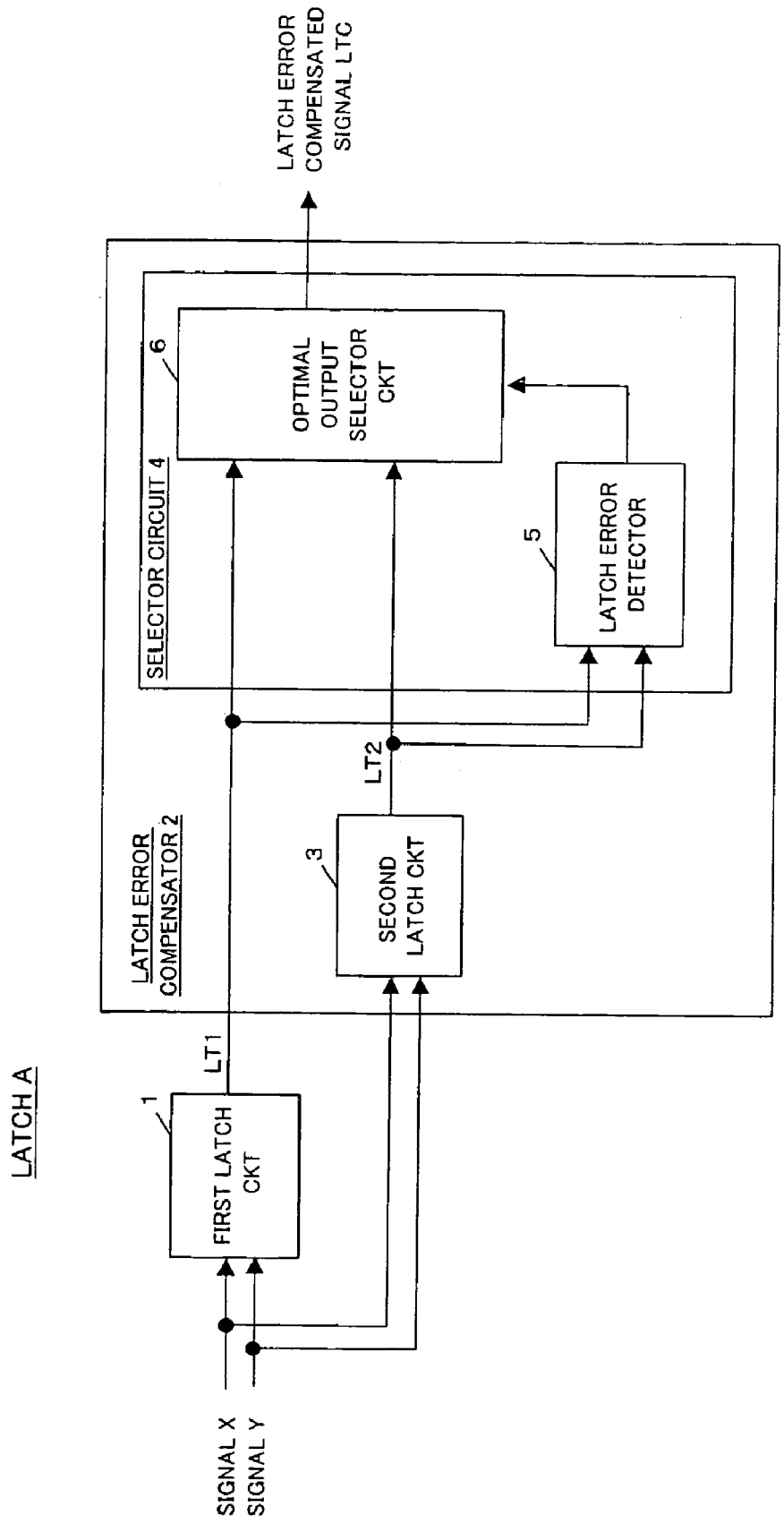
FIG. 1 is a block diagram illustrating the configuration of a latch according to one embodiment of the present invention.

FIG. 1 is a block diagram illustrating the configuration of a latch A according to one embodiment of the present invention. As illustrated, the latch A comprises a first latch circuit 1 which has two input terminals for receiving a signal X and a signal Y; and a latch error compensator 2 for compensating the latch circuit 1 for a latch error. The latch error used herein may refer to an error in a latch output caused by an operation of the latch circuit 1, for example, in an unstable region, i.e., an erroneous operation of the latch circuit 1. Specifically, the latch circuit 1 receives the two input signals X and Y, and latches the signal X in response to the signal Y, for example, in response to a predetermined portion of the signal Y (for example, a certain waveform portion such as a rising edge or a falling edge), and delivers its latch signal LT1 at its output terminal. The latch error compensator 2, which in turn has an input terminal for receiving the latch signal LT1, and input terminals for receiving the two signals X and Y, compensates the latch circuit 1 for a possible latch error, and generates a compensated latch signal LTC at its output terminal. The latch used herein may include latches in a variety of circuit configurations such as D-latch, D-flip-flop, and the like.

According to one embodiment of the present invention, the latch error compensator 2 comprises a second latch circuit 3 and a selector circuit 4. Specifically, the latch circuit 3 is similar in circuit configuration to the latch circuit 1, and has two input terminals for receiving the signals X and Y, which are the same inputs as those of the latch circuit 1, and latches the signal X in response to the signal Y, for example, in response to a predetermined portion of the signal Y (for example, a certain waveform portion such as a rising edge or a falling edge), and delivers its latch signal LT2 at its output terminal. However, the latch circuit 3 operates in response to a different waveform portion from the waveform portion to which the latch circuit 1 responds. For example, when the latch circuit 1 operates in response to a rising edge of the signal Y, the latch circuit 3 may operate in response to a falling edge of the signal Y. Next, the selector circuit 4 has two input terminals for receiving the two latch signals LT1 and LT2 from the latch circuit 1 and latch circuit 3, and compensates the latch circuit 1 for a possible latch error by selecting one of the two latch signals and delivering the selected one to its output terminal.

As illustrated in FIG. 1, according to one embodiment of the present invention, the selector circuit 4 comprises a latch error detector 5 and an optimal output selector circuit 6. The latch error detector 5 has two input terminals for receiving the two latch signals LT1 and LT2 from the circuits 1 and 3, respectively, and detects the presence or absence of a latch error in the received latch signals, and generates the result of the detection at its output terminal. The optimal output selector circuit 6 at the next stage has an input terminal for receiving a signal indicative of the result of the detection as well as two input terminals for receiving the two latch signals LT1 and LT2 from the circuits 1 and 3, respectively. Then, the optimal output selector circuit 6 selects one of the two latch signals LT1 and LT2 based on the result of the detection in the latch error detector 5, and delivers the selected latch signal as a latch error compensated signal. Here, the optimal output selector circuit 6 may employ any selecting method which can remove a latch error associated with the latch circuit 1.

Figure 2:
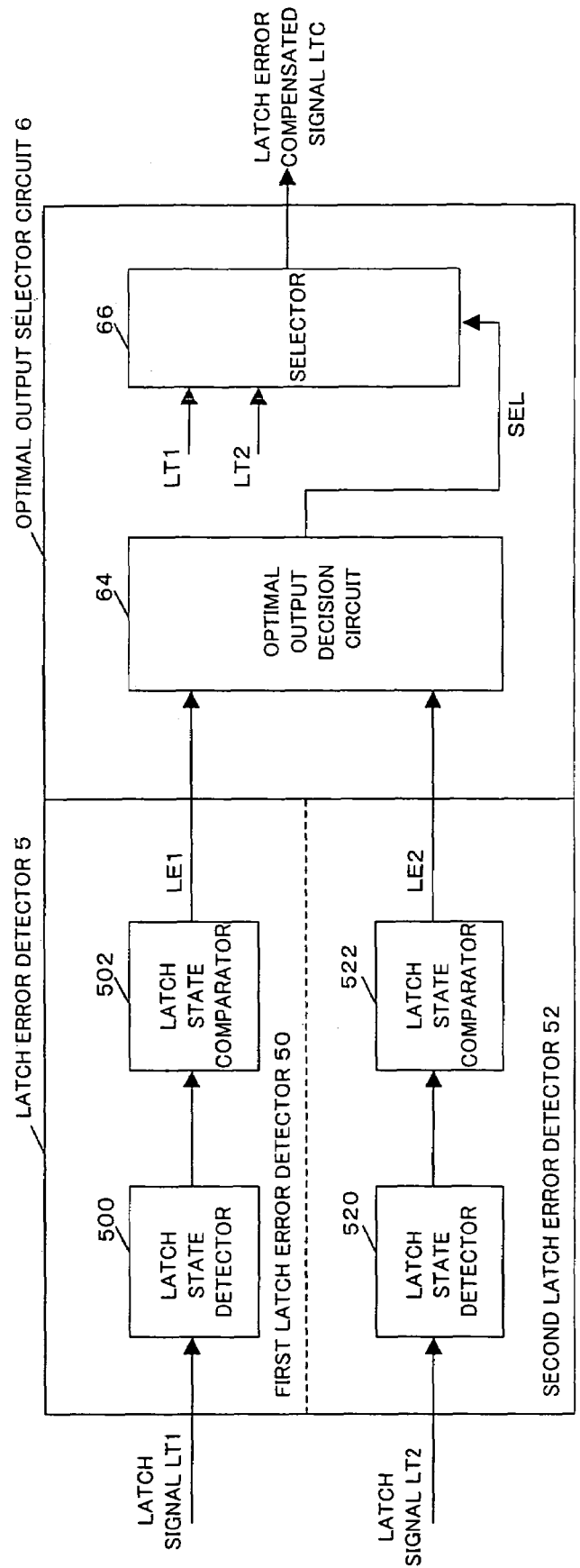
FIG. 2 is a block diagram illustrating one embodiment of a latch error detector and an optimal output selector circuit illustrated in FIG. 1.

Referring next to FIG. 2, the latch error detector 5 and optimal output selector circuit 6 according to one embodiment will be described in terms of the circuit configuration. As illustrated, the latch error detector 5 comprises two latch error detectors, i.e., a first latch error detector 50 and a second latch error detector 52. Specifically, the first latch error detecting section 50 comprises a latch state detector 500 and a latch state comparator 502. The latch state detector 500, which has an input for receiving the latch signal LT1 from the latch circuit 1, detects a latch state from the latch signal LT1, and delivers a latch state signal indicative of the latch state to its output. Here, the latch state may refer to a state which can include information related to an erroneous operation of the latch circuit. For example, the latch state may include information related to a latching position. The information related to a latching position may be acquired by measuring a time length from a predetermined reference position in accordance with any of a variety of methods. The latch state comparator 502 at the next stage receives the latch state signal at its input, compares the latch state represented by the received latch state signal with a reference latch state, and delivers a latch error signal LE1 indicative of the presence or absence of a latch error to its output as a result of the comparison. Next, the second latch error detector 52, which comprises a latch state detector 520 and a latch state compensator 522, receives the latch signal LT2 and generates a latch error signal LE2. Since the latch error detector 52 is identical in circuit configuration to the first latch error detector 50, detailed description thereof is omitted.

As illustrated in FIG. 2, the optimal output selector circuit 6 comprises an optimal output decision circuit 64 and a selector 66. First, the optimal output decision circuit 64 has an input for receiving the output LE1 from the comparator 502, and an input for receiving the output LE2 from the comparator 522, and determines, based on the two latch error signals, which of the latch signals from the latch circuits 1 and 3 is optimal for removing a latch error, and delivers a selection signal SEL indicative of an optimal latch signal to its output. The selector 66 at the next stage has a control input for receiving the selection signal SEL and inputs for receiving the latch signals LT1 and LT2, respectively. The selector 66 selects one of the received latch signals based on the selection signal SEL, and delivers the selected latch signal to its output as a compensated latch signal LTC.

Figure 3:
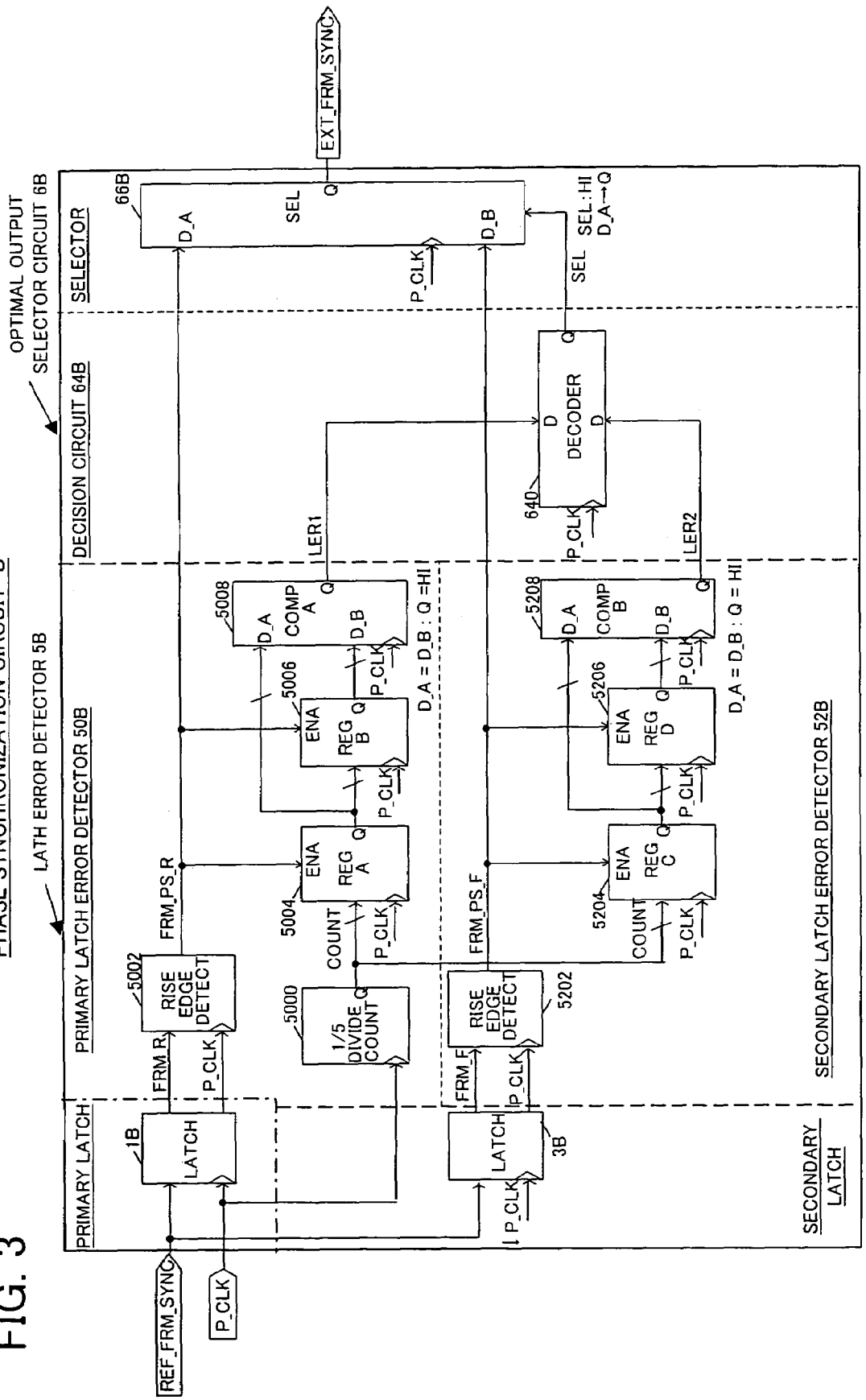
FIG. 3 is a block diagram illustrating the configuration of a phase synchronization circuit according to one embodiment of the present invention.

Referring next to FIG. 3 and FIGS. 4 to 11, a phase synchronization circuit B according to one embodiment of the present invention will be described. The phase synchronization circuit B is implemented by use of the latch according to the present invention. In FIG. 3, components corresponding to those shown in FIGS. 1 and 2 are designated by the same reference numerals with a letter "B" suffixed thereto. FIGS. 4 to 8 and FIGS. 10 to 11 are timing diagrams illustrating waveforms appearing at respective points in the circuit of FIG. 3. The phase synchronization circuit B illustrated in FIG. 3 functions to establish phase synchronization of a reference frame synchronization signal REF_FRM_SYNC received from the outside to a parallel clock P_CLK, and to deliver to its output terminal an external frame synchronization signal EXT_FRM_SYNC resulting from the phase synchronization. The parallel clock P_CLK is restored from a serial digital interface (SDI) signal. The SDI signal may include HD (High Definition)—SDI or SD (Standard Definition)—SDI.

FIG. 4 shows the relationship of a variety of formats to associated digital video clock frequencies and numbers of dots per frame for the HD-SDI and SD-SDI signals. For example, HD-SDI commonly used in Japan employs a format of 1920×1080i/59.94. In this format, the frame frequency is one half of 59.94 Hz, the frequency of the parallel clock P_CLK is equal to the shown digital video clock frequency 74.25 MHz divided by 1.001 (74.25 MHz/1.001), the number of dots per frame is 2,475,000, and the number of dots per horizontal line is 2,200.

Figure 6:
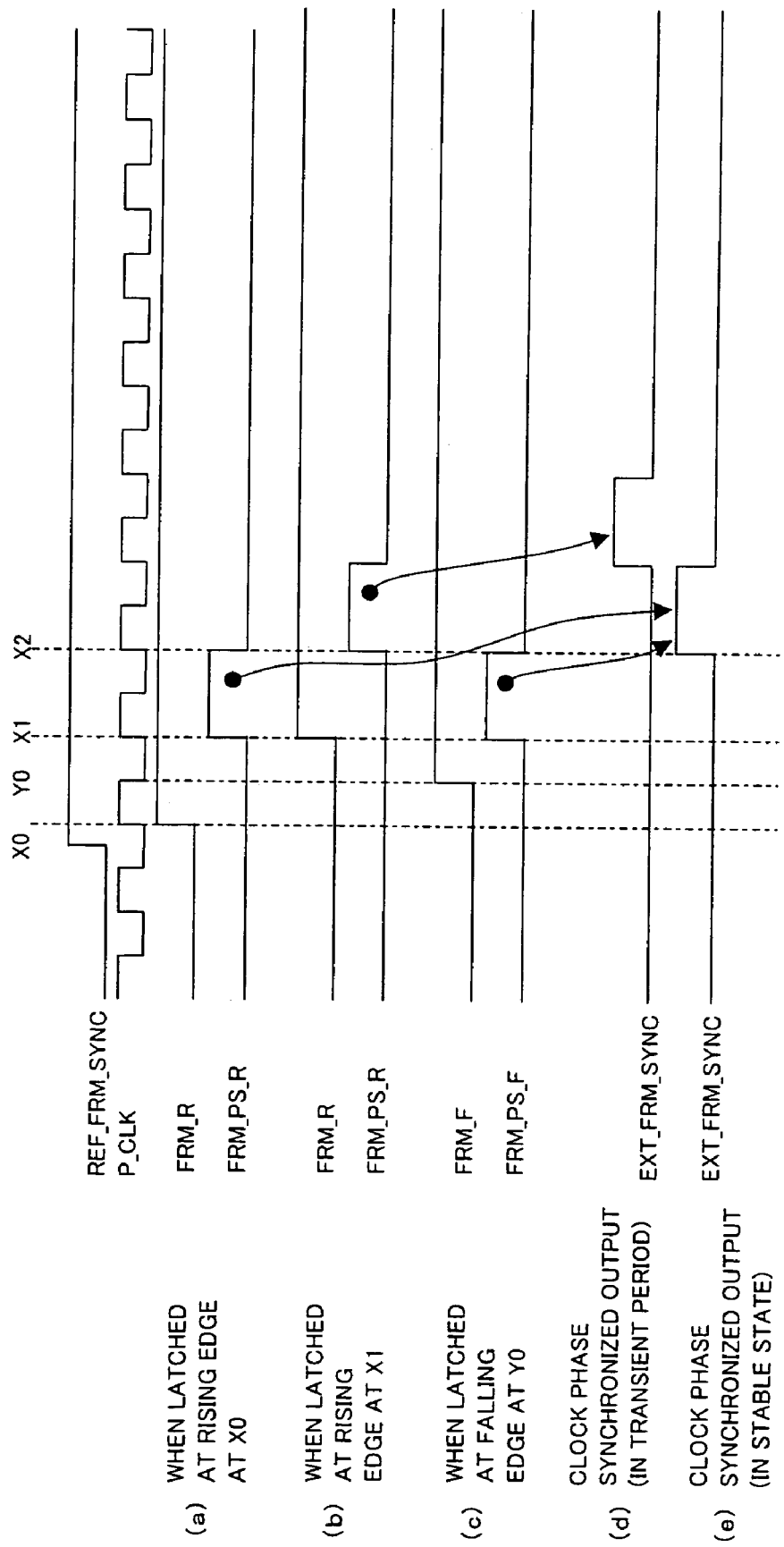
FIG. 6 is a timing diagram illustrating a latch error compensating operation performed by the phase synchronization circuit of FIG. 3 in the exemplary operation shown in FIG. 5.
Figure 7:
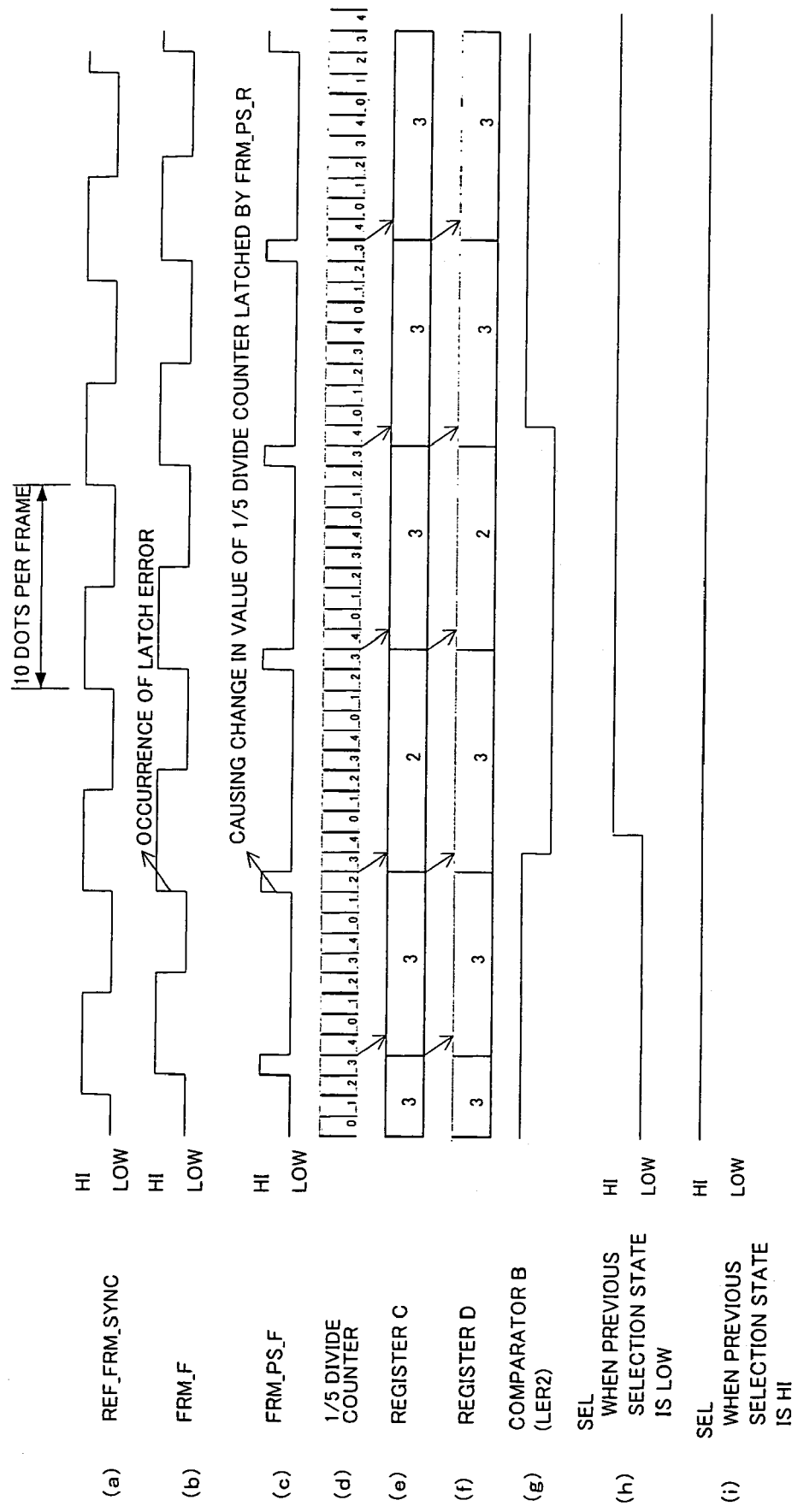
FIG. 7 is a timing diagram illustrating waveforms appearing at various points in the phase synchronization circuit of FIG. 3, showing a timing relationship when a latch error is present only in a secondary latch.
Figure 8:
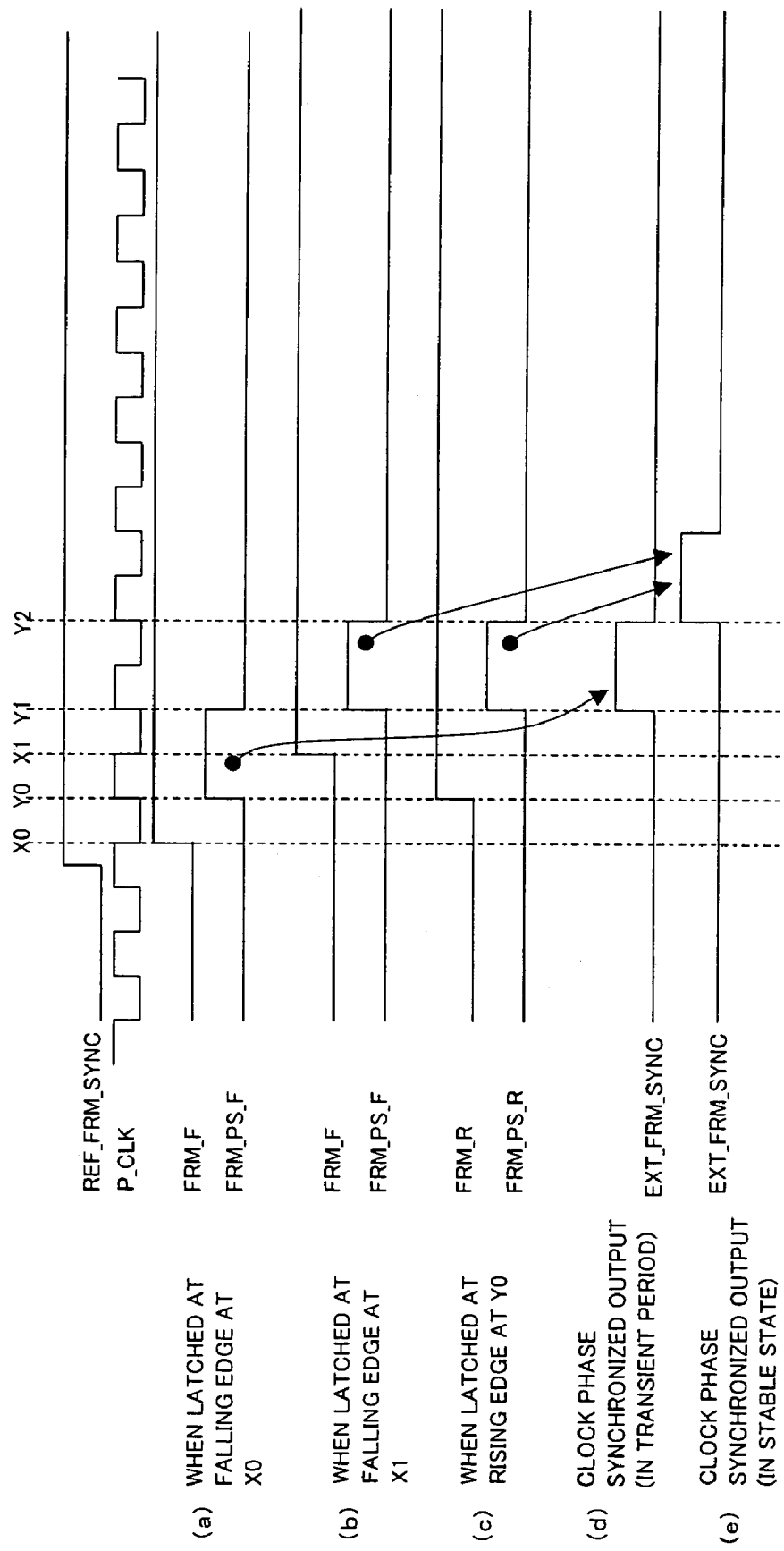
FIG. 8 is a timing diagram illustrating a latch error compensating operation performed by the phase synchronization circuit of FIG. 3 in the exemplary operation shown in FIG. 7.

Turning back to FIG. 3, to continue the description, the phase synchronization circuit B comprises a primary latch 1B, a secondary latch 3B, a latch error detector 5B, and an optimal output selector circuit 6B, as illustrated, corresponding to the configuration of the latch illustrated in FIGS. 1 and 2. The latch error detector 5B comprises a primary latch error detector 50B associated with the primary latch 1B, and a secondary latch error detector 52B associated with the secondary latch 3B. Specifically, the primary latch 1B latches the reference frame sync signal REF_FRM_SYNC (see FIG. 5(a), FIG. 6, FIG. 7 and FIG. 8) in response to a rising edge of the parallel clock P_CLK (see FIGS. 6 and 8), and generates a frame synchronization signal FRM_R (see FIGS. 5(b) and 6) which is its latch output. Note that, in the timing diagrams of FIGS. 5 and 7, for simplifying the illustration, one frame is represented by ten dots. Similarly, the secondary latch 3B also has inputs for receiving the reference frame sync signal REF_FRM_SYNC and parallel clock P_CLK, but the secondary latch 3B performs a latching operation in response to a falling edge of the clock P_CLK to generate a frame sync signal FRM_F at its output, which is its latch output (these signals are shown in FIGS. 7 and 8). In this embodiment, a form of signal such as a frame pulse signal FRM_PS_R is used as a form of the external frame sync signal output from the phase synchronization signal, rather than the frame sync signal FRM_R.

Figure 5:
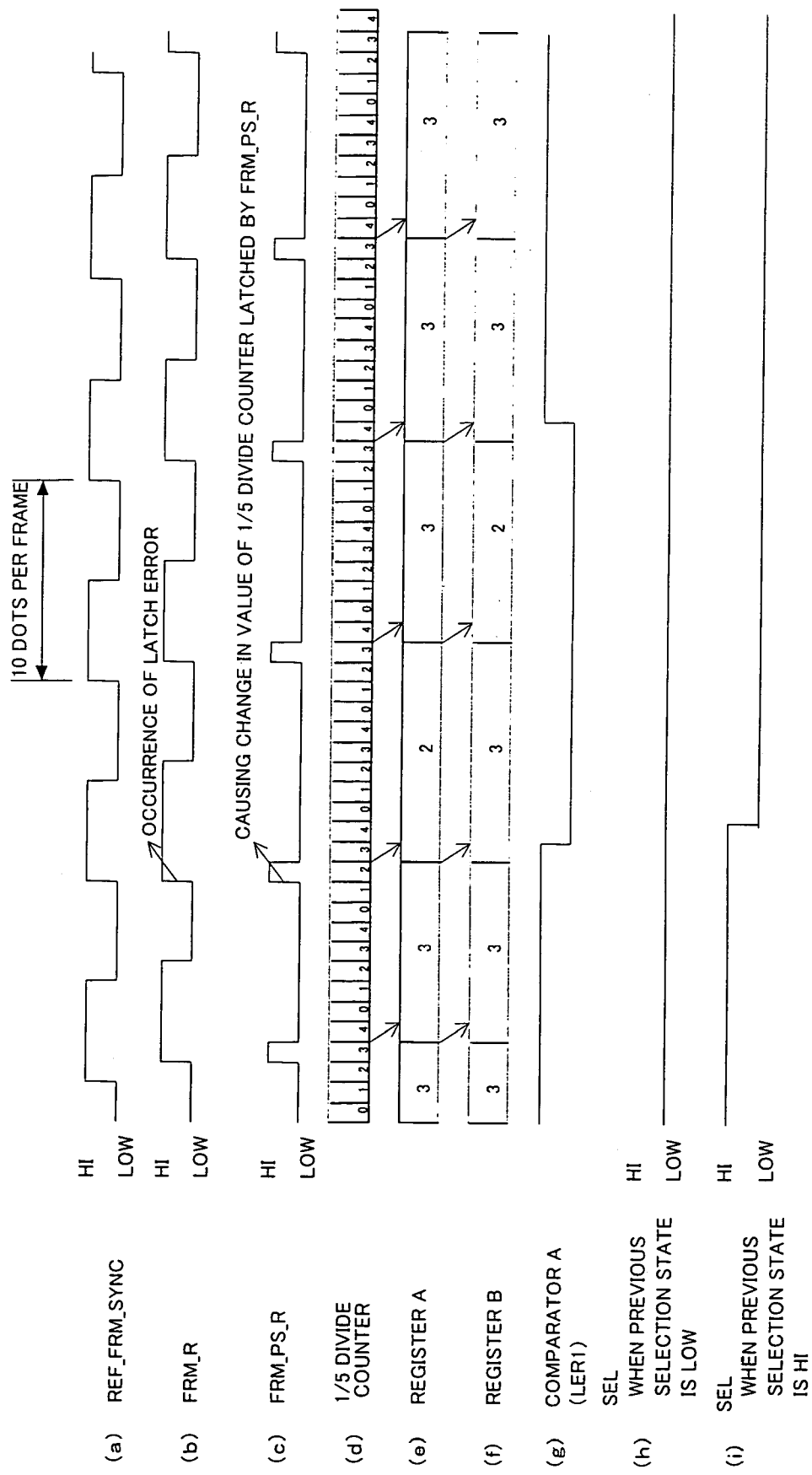
FIG. 5 is a timing diagram illustrating waveforms appearing at various points in the phase synchronization circuit of FIG. 3, showing a timing relationship when a latch error is present only in a primary latch.

First, the primary latch error detector 50B will be described with reference particularly to FIGS. 5 and 6. FIGS. 5 and 6 are timing diagrams illustrating waveforms which are observed when there is no latch error in the secondary latch 3B. The detector 50B comprises a divide by five counter 5000; a rising edge detector 5002; two registers, i.e., register 5004 (register A) and register 5006 (register B); and a comparator 5008 (comparator A). The edge detector 5002, which may be comprised, for example, of a flip-flop, receives the frame sync signal FRM_R and clock P_CLK at its inputs, and generates a frame pulse signal FRM_PS_R (see FIGS. 5(c) and 6) which goes to high level when a rising edge of the signal FRM_R is detected, and remains at high level for one period of the parallel clock P_CLK. The frame pulse signal FRM_PS_R indicates a rising edge of the frame sync signal FRM_R, i.e., a position at which the primary latch 1B actually latched the reference frame sync signal REF_FRM_SYNC. The divide by five counter 5000 receives the parallel clock P_CLK at its input, counts the clock P_CLK divided by five, and generates a counter output COUNT (FIG. 5(d)). The register A at the next stage is coupled to receive the counter output at one input, receive the frame pulse signal FRM_PS_R at an enable (ENB) input, and receive the parallel clock P_CLK at a clock input. The register A fetches the counter output COUNT while it is enabled, and stores the output COUNT for one frame period (see FIG. 5(e)). Similarly, the register B has an enable input and a clock input for receiving like inputs, but the register B is coupled to receive a Q-output of the register A at one input, and stores the value stored in the register A for one frame period (FIG. 5(f)). Thus, the register A and register B store the counter output values COUNT in frames adjacent to each other. The comparator A has a data input D_A for receiving the value stored in the register A, and a data input D_B for receiving the value stored in the register B, and is also coupled to receive the parallel clock P_CLK at a clock input. Then, the comparator A compares the COUNT values received at its two data inputs with each other, and generates a latch error signal LER1 (FIG. 5(g)) at its output. The latch error signal LER1 is at high level when the COUNT values are the same in the adjacent frames, and at low level when they are different.

Next, the secondary latch error detector 52B will be described with reference particularly to FIGS. 7 and 8. FIGS. 7 and 8 are timing diagrams illustrating waveforms which are observed when there is no latch error in the primary latch 1B. As illustrated, the secondary latch error detector 52B, which is substantially identical in circuit configuration to the primary latch error detector 50B, comprises a rising edge detector 5202; a register 5204 (register C); a register 5206 (register D); and a comparator 5208 (comparator B). The divide by five counter 5000 is shared by the detectors 50B and 52B as a common component. With the foregoing configuration, the rising edge detector 5202 receives the frame sync signal FRM_F at one input, and generates at its output a frame pulse signal FRM_PS_F which goes to high level upon detection of a rising edge of the frame sync signal FRM_F and remains at high level for one period of the clock P_CLK. The frame pulse signal FRM_PS_F also indicates a position at which the secondary latch 3B actually latched the reference frame sync signal REF_FRM_SYNC. The remaining circuit components, i.e., the register C, register D and comparator B are identical to their counterparts in the detector B except for the reception of the frame pulse signal FRM_PS_F instead of the signal FRM_PS_R. Therefore, the comparator B receives the output of the register C (see FIG. 7(e)) and the output of the register D (FIG. 7(f)), and generates a latch error signal LER2 (FIG. 7(g)) at its output. As illustrated, the latch error signal LER2 is at high level when the COUNT values are the same in adjacent frames, and at low level when they are different.

The optimal output selector circuit 6B illustrated in FIG. 3 comprises an optimal output decision circuit 64B and a selector 66B.

With reference also to FIG. 9, the optimal output decision circuit 64B will be described. As illustrated, the optimal output decision circuit 64B in this embodiment is comprised of a decoder 640. The decoder 640 has two data inputs connected to a Q-output of the comparator A and a Q-output of the comparator B, respectively, for receiving the latch error signals LER1 and LER2 from the comparators, respectively, and generates a selection signal SEL indicative of a latch signal to be selected at its output. The decoder 640 may be implemented by a conventional logic circuit, and a decoding function provided by the logic circuit is shown in FIG. 9. In FIG. 9, the latch error signal indicates no latch error detected when it is at high level (HI), and indicates a latch error detected when it is at low level (LOW). The selection signal in turn indicates that a latch signal output from the primary latch 1B should be selected when it is at high level (HI), indicates that a latch signal output from the secondary latch 3B should be selected when it is at low level (LOW), and indicates that the same latch signal as that previously selected should be selected when it presents "=".

More specifically, as shown in the truth table of FIG. 9 for the decoding logic in the decoder 640, when there is a latch error in the primary latch 1B (LER1=LOW) as indicated in (2) of FIG. 9, the decoder 640 indicates the selection of the latch output from the other secondary latch 3B (SEL=LOW). On the other hand, when there is a latch error in the secondary latch 3B (LER2=LOW) as indicated in (3) of FIG. 9, the decoder 640 indicates the selection of the latch output from the primary latch 1B (SEL=HI). In this way, when a latch error is detected in either the primary latch or secondary latch, the output from the other latch is selected. When latch errors are detected in both the primary latch and secondary latch, as indicated in (1) of FIG. 9 (LER1, LER2=LOW), or when no latch error is detected either in the primary latch or in the secondary latch as indicated in (4) of FIG. 9 (LER1, LER2=HI), the decoder 640 indicates the selection of the same latch signal as that selected in the preceding frame (SEL="=").

Next, the selector 66B has a control input for receiving the selection signal SEL from the decoder 640; an input for receiving the frame pulse signal FRM_PS_R from the edge detector 5002 of the primary latch 1B; an input for receiving the frame pulse signal FRM_PS_F from the rising edge detector 5202 of the secondary latch 3B; and an input for receiving the parallel clock P_CLK. Thus, the selector 66B delivers one of the frame pulse signals as indicated by the selection signal SEL, i.e., the latch output from the primary latch 1B to a Q-output when SEL=HI, and delivers the latch output from the secondary latch 3B to the Q-output when SEL=LOW, thereby generating the compensated external frame sync signal EXT_FRM_SYNC.

Referring now to the actual operation performed when a latch error occurs in the primary latch 1B while no latch error occurs in the secondary latch 3B, as illustrated in FIG. 5, since the comparator A outputs the latch error signal LER1 at high level in the first frame in FIG. 5, this state falls under case (4) of FIG. 9, indicating the selection of a latch signal selected immediately before this frame. It is assumed here that the latch output from the secondary latch 3B was selected (SEL=LOW) in the preceding frame, as shown in FIG. 5(h). Then, this causes the latch error signal LER1 to go to low, which falls under case (2) of FIG. 9, so that the selection signal SEL goes to low level, indicating the selection of the output from the secondary latch 3B. Therefore, the selection signal in FIG. 5(h) remains at low level. On the other hand, assuming that the selection signal SEL is at high level in the first frame to select the output from the primary latch 1B, as shown in FIG. 5(i), when the latch error signal LER1 goes to low level in the second frame, this causes the selection signal SEL to transition from high to low, resulting in a shift from the primary latch output to the secondary latch output.

Referring next to FIG. 6, the latch error compensating operation of the phase synchronization circuit B in the exemplary operation illustrated by FIG. 5 will be described in greater detail. It is assumed first that the reference frame sync signal REF_FRM_SYNC and parallel clock P_CLK, received by the phase synchronization circuit B, are in a temporal relationship as shown in FIG. 6. When a latch actually occurs at a rising edge X0 of the parallel clock as shown in FIG. 6(a), the frame pulse signal FRM_PS_R goes to high level after one clock. On the other hand, when a latch actually occurs at a rising edge X1 of the parallel clock as shown in FIG. 6(b), the frame pulse signal FRM_PS_R goes to high one clock after the occurrence of the latch, so that the frame pulse signal FRM_PS_R delays by one period of the parallel clock P_CLK, as compared with the operation illustrated by FIG. 6(a). When the reference frame sync signal REF_FRM_SYNC is near a rising edge of the parallel clock P_CLK as in the foregoing case, an erroneous operation of the primary latch 1B causes the frame pulse signal FRM_$_{PS}$_R, which is the latch output, to shift in time by one clock period, as shown in FIGS. 6(a) and 6(b). In other words, the latching position may shift from the rising edge X0 to the rising edge X1, or may shift from X1 to X0. As a result, the external frame sync signal EXT_FRM_SYNC output from the selector 66B is delayed by one clock from the frame pulse signal FRM_PS_R, so that the resulting waveform of the external frame sync signal EXT_FRM_SYNC will be as shown in FIG. 6(d) or FIG. 6(e). Particularly, from the frame pulse signal FRM_PS_R shown in FIG. 6(b), the resulting external frame sync signal EXT_FRM_SYNC is as shown in FIG. 6(d). A latch error due to such an erroneous operation of the latch is compensated for by the secondary latch 3B which latches at a falling edge of the parallel clock, as shown in FIG. 6(c). Specifically, the secondary latch 3B latches at a falling edge Y0, causing the frame sync signal FRM_F to rise at Y0, and the frame pulse signal FRM_PS_F, which is the output of the secondary latch, goes to high level one-half period of the parallel clock P_CLK after the rising of the signal FRM_F. This frame pulse signal FRM_PS_F is the same as the frame pulse signal FRM_PS_R shown in FIG. 6(a).

For greater detail, description will be first made on a shift of the frame pulse signal FRM_PS_R from the position X1 to the position X2. In this case, both the frame pulse signals FRM_PSR and FRM_PSF are output at the position X1 before the shift occurs. Since it is assumed that no latch error is detected either in the primary latch or in the secondary latch, the decoder 640 holds the previously selected state (SEL="="). Then, the external frame sync signal EXT_FRM_SYNC is output at the position X2 irrespective of whether the primary latch or secondary latch is selected. With this situation, when the frame pulse signal FRM_PS_R shifts from X1 to X2, a latch error will be detected in the primary latch. As a result, the decoder 640 selects the frame pulse signal FRM_PS_F associated with the secondary latch. Thus, the external frame sync signal EXT_FRM_SYNC is still output at the same position X2 as before the shift. In other words, even if a detected latch error causes the selection signal SEL to switch, the external frame sync signal EXT_FRM_SYNC will not shift in position.

Conversely, when the frame pulse signal FRM_PS_R which has been output at X2 shifts to X1, the frame pulse signal FRM_PS_R is output at X2 while the frame pulse signal FRM_PS_F is output at X1 before the shift occurs. If the selection signal SEL was, for example, at high level before the shift occurred, i.e., when the preceding selection was made, the primary latch is selected. With this situation, if the foregoing latch error from X2 to X1 is detected in the current frame, the secondary latch will be selected. In this way, the external frame sync signal EXT_FRM_SYNC shifts by one clock from FIG. 6(d) to FIG. 6(e) before it becomes stable. On the other hand, if the selection signal SEL was at low level, indicating a selection of the secondary latch, the secondary latch is continuously selected in the current frame even if a latch error is detected in the primary latch. As a result, the external frame sync signal EXT_FRM_SYNC is continuously output as illustrated in FIG. 6(e). In this way, the phase synchronization circuit B can compensate for an error due to a shift in latching position which results from an operation of the primary latch in an instable region.

Next, referring to FIG. 7 which illustrates an actual operation of the phase synchronization circuit B when a latch error occurs in the secondary latch 3B while no latch error occurs in the primary latch 1B, in the first frame, the comparator B outputs the latch error signal LER2 at high level, which falls under the case (4) in FIG. 9, indicating the selection of a latch signal which has been selected immediately before this frame. It is assumed here that the output from the secondary latch has been selected as illustrated in FIG. 7(h) (SEL=LOW). Then, the latch error signal LER2 goes to low in the second frame, which falls under case (3) of FIG. 9, causing the selection signal SEL to go to high level to indicate the selection of the output from the primary latch. On the other hand, assuming that the selection signal SEL is at high level to select the output from the primary latch in the first frame, as illustrated in FIG. 5(i), when the latch error signal LER2 goes to low level in the second frame, the selection signal SEL remains at high level, thereby continuously selecting the output from the primary latch.

Referring now to FIG. 8, the latch error compensating operation of the synchronization circuit B in the exemplary operation of FIG. 7 will be described in greater detail. While FIG. 8 is similar to FIG. 6, the parallel clock P_CLK in FIG. 8 is in an inverse phase relationship to that of FIG. 6, and a rising edge of the reference frame sync signal is near a falling edge of the clock P_CLK, causing a latch error in the secondary latch. To comply with these differences, FIG. 8 differs from FIG. 6 in that FIGS. 8(a) and 8(b) illustrate signals associated with the secondary latch, and FIG. 8(c) illustrates signals associated with the primary latch. It should be noted that in the primary latch, the frame pulse signal FRM_PS_R rises one period of the parallel clock P_CLK after the frame sync signal FRM_R rises, whereas in the secondary latch, the frame pulse signal FRM_PS_F rises with a delay of one-half period of the parallel clock P_CLK from the rising of the frame sync signal FRM_F. Therefore, though detailed description is omitted, a latch error can even be compensated for which involves a shift of one clock period as shown in FIGS. 8(a) and 8(b) by the movement of the frame pulse signal FRM_PS_F between Y0 and Y1. When the compensating operation is stabilized, the external frame sync signal EXT_FRM_SYNC shown in FIG. 8(e) is generated using the frame pulse signal FRM_PS_R in the primary latch shown in FIG. 8(c).

In the foregoing manner, the phase synchronization circuit B according to one embodiment of the present invention is provided with two latch circuits such that a latch error in one latch circuit can be compensated for by using the output of the other latch circuit.

Referring next to FIGS. 10 and 11, description will be made on the operation of the synchronization circuit B shown in FIG. 3 when no latch error occurs either in the primary latch 1B or in the secondary latch 3B. FIG. 10 is a timing diagram similar to FIGS. 6 and 8, illustrating the operation of the phase synchronization circuit B when an edge of the reference frame sync signal REF_FRM_SYNC exists between a falling edge and a rising edge of the parallel clock P_CLK. As illustrated, a latch output is selected from either of the primary latch and secondary latch since no latch error occurs either in the primary latch or in the secondary latch. In this event, the frame pulse signal FRM_PS_R shown in FIG. 10(a) matches the frame pulse signal FRM_PS_F shown in FIG. 10(b). Thus, even if a selection is switched from one to the other, the resulting external frame sync signal EXT_R-FM_SYNC output from the phase synchronization circuit B has the same waveform. Such switching of the selection may occur when the external frame sync signal REF_FRM_SYNC is turned on/off (for example, the presence or absence of the signal, or coupling or decoupling of the signal) or when an SDI signal is turned on/off (for example, the presence or absence of the signal, or coupling or decoupling of the signal).

FIG. 11 in turn is a timing diagram similar to FIGS. 6 and 8, illustrating the operation of the phase synchronization circuit B shown in FIG. 3 when an edge of the sync signal REF_FRM_SYNC exists between a rising edge and a falling edge of the parallel clock P_CLK. Likewise, in this event, since no latch error occurs either in the primary latch or in the secondary latch, the decoder 640 holds the previous selection to select a latch output either from the primary latch or from the secondary latch. However, in the timing relationship shown in FIG. 11, unlike the situation illustrated by FIG. 10, the frame pulse signal FRM_PS_F shown in FIG. 11(a) and the frame pulse signal FRM_PS_R shown in FIG. 11(b) shift from each other by one clock, so that when the selection is switched from one to the other, the sync signal EXT_FRM_SYNC in FIG. 11(c) generated from the frame pulse signal FRM_PS_F and the signal EXT_FRM_SYNC generated from the frame pulse signal FRM_PS_R in FIG. 11(d) shift from each other by one clock. As described above, such switching of the selection may occur when the external frame sync signal REF_FRM_SYNC is turned on/off (for example, the presence or absence of the signal, or coupling or decoupling of the signal) or when an SDI signal is turned on/off (for example, the presence or absence of the signal, or coupling or decoupling of the signal).

Figures 12, 13:
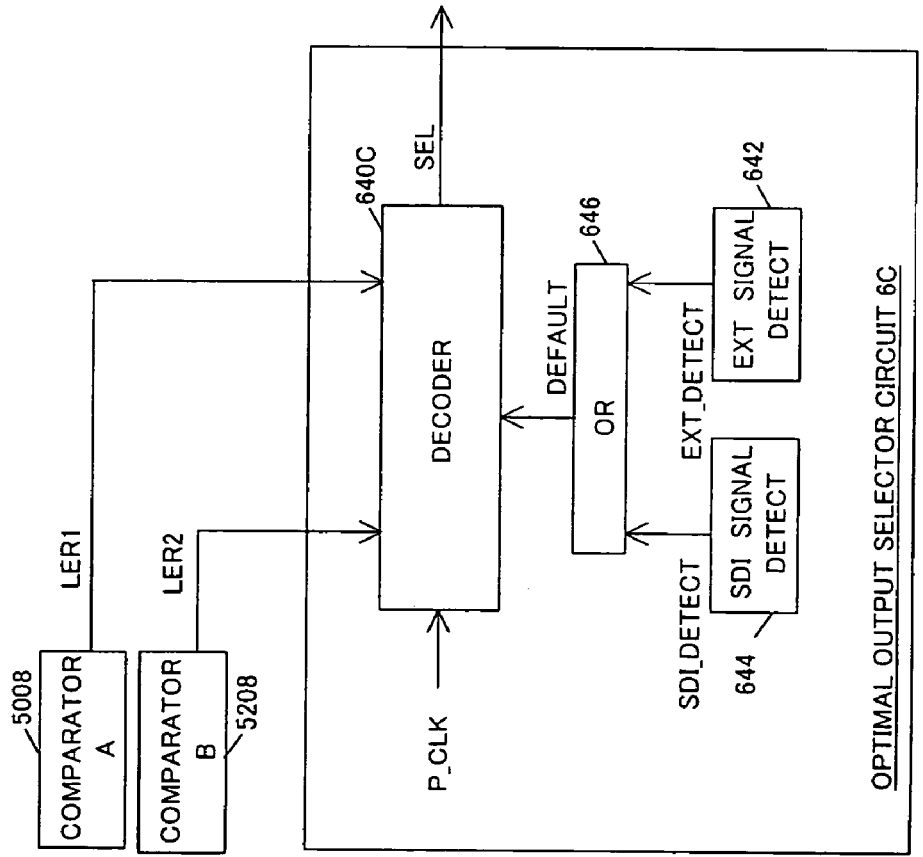
FIG. 12 is a block diagram illustrating an alternative configuration of the optimal output selector circuit shown in FIG. 3.
FIG. 13 shows a truth table for decoding logic of a decoder shown in FIG. 12.

FIG. 12 illustrates the optimal output selector circuit 6C for solving the problem described in connection with FIG. 11 in accordance with one embodiment of the present invention. The optimal output selector circuit 6C functions to fix the selection signal SEL when it detects the reference sync signal FRM_SYNC being turned on/off or the SDI signal being turned on/off. As illustrated, the optimal output selector circuit 6C comprises a decoder 640C corresponding to the decoder 640; an external signal (EXT SIGNAL) detector 642; an SDI signal detector 644; and an OR circuit 646. More specifically, the external signal detector 642 operates to output an external detection signal EXT_DETECT which is at high level (HI) for a certain period of time when the external sync signal is input to the phase synchronization circuit B or to an apparatus including the circuit B. It should be noted that the reference frame sync signal REF_FRM_SYNC in FIG. 3 is derived from the external reference sync signal. The detector 642 may be implemented by any circuit of conventional design for detecting the presence or absence of a signal. Similarly, the SDI signal detector 644 operates to output an SDI detection signal SDI_DETECT which is at high level (HI) for a certain period of time when an SDI signal is input to the phase synchronization circuit B or to an apparatus including the circuit B. It should be noted that the parallel clock P_CLK in FIG. 3 is derived from the SDI signal. The detector 644 may also be implemented by any conventional circuit as is the case with the detector 642. The OR circuit 646, which receives the signals EXT_DETECT and SDI_DETECT from the detectors 642 and 644, generates a default signal DEFAULT at its output. The default signal DEFAULT is at high level while both or one of the detection signals EXT_DETECT and SDI_DETECT remain at high level, thus indicating a default state. The decoder 640C, which has an input for receiving the default signal DEFAULT, also has inputs for receiving the latch error signals LER1 and LER2 from the comparators 5008 and 5208, respectively, as does the decoder 640 in FIG. 3.

FIG. 13 shows a truth table for the decoding logic of the decoder 640C. As can be seen from FIG. 13, when the default signal DEFAULT is at high level, i.e., in the default state, the selection signal SEL remains at high level (HI) irrespective of the states of the latch error signals LER1 and LER2. This means that a latch signal from the primary latch is selected at all times in the default state, and the frame pulse signal FRM_PS_R is selected at all times in the example of FIG. 11. This strategy can help solve a problem caused by the selection switched between the frame pulse signals FRM_PS_F and FRM_PS_R. On the other hand, when the default signal DEFAULT is at low level, i.e., in a non-default state, the decoder 640C operates in the same manner as that shown in FIG. 9. The operation involved in this state has been already described with reference to FIG. 9. For example, when either the primary latch 1B or secondary latch 3B is not malfunctioning immediately after the end of the default state, both the latch error signals LER1 and LER2 are at high, causing the selection signal SEL to take "=", thus holding the previous selection. Thus, the primary latch selected during the default state is maintained. While the truth table shown in FIG. 13 defines that the primary latch is selected by the selection signal SEL during the default state, the decoder 640C may simply maintain a latch signal selected from any of the primary and secondary latches. Thus, the truth table may be modified to select the secondary latch at all times during the default state.

Figure 14:
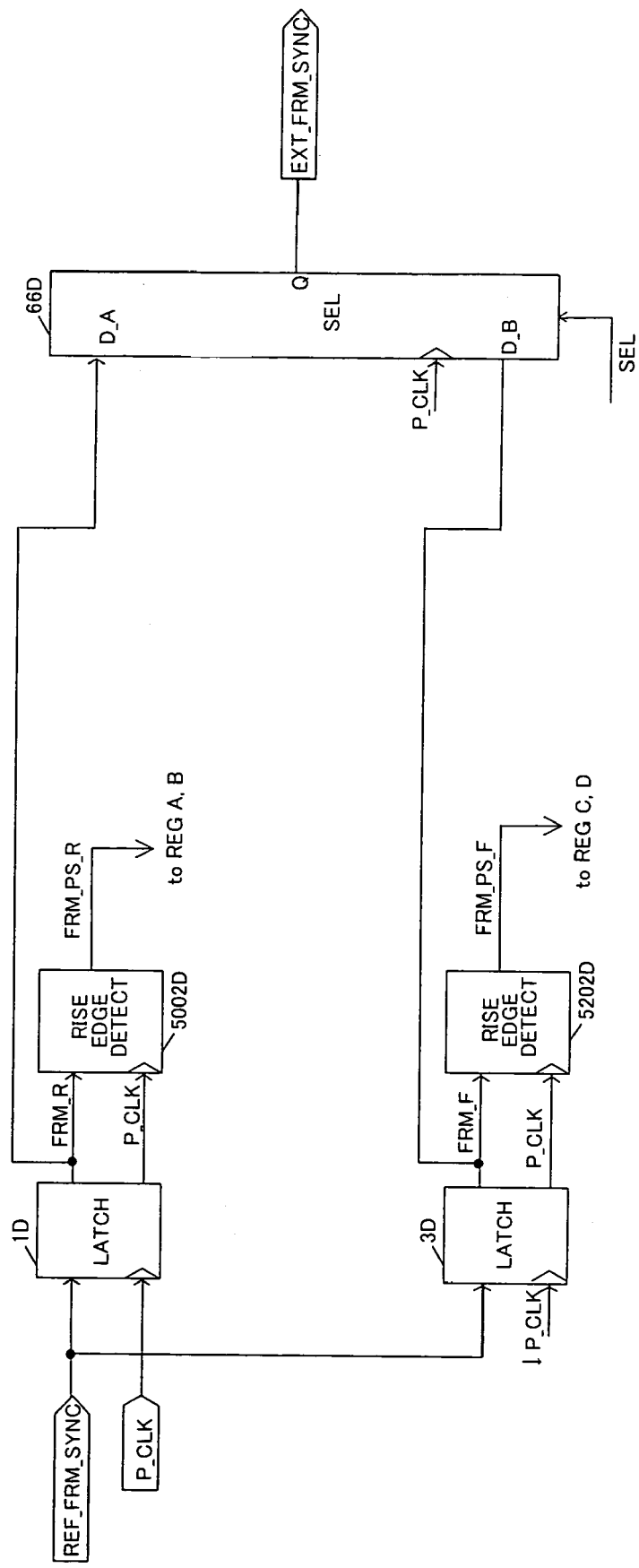
FIG. 14 is a block diagram illustrating the configuration of a phase synchronization circuit according to another embodiment of the present invention.

Referring next to FIG. 14, description will be made on a phase synchronization circuit D according to another embodiment of the present invention. The phase synchronization circuit D is substantially identical to the phase synchronization circuit B shown in FIG. 3 or the phase synchronization circuit B with the modification of FIG. 12 added thereto. Therefore, FIG. 14 illustrates only different components, with the remaining components being omitted from the illustration. Also, in FIG. 14, components corresponding to those in FIG. 3 are designated by the same reference numerals with a letter "D" suffixed thereto. Specifically, the differences in the phase synchronization circuit D lie in that latch signals delivered from a primary latch 1D and a secondary latch 3D are directly supplied to data inputs of a selector 66D, and outputs of rising edge detectors 5002D and 5202D are supplied only to associated registers A and B and registers C and D, respectively. This aspect of the phase synchronization circuit D differs from the phase synchronization circuit B shown in FIG. 3 in which the outputs of the edge detectors 5002 and 5202 are supplied to the selector 66B. The phase synchronization circuit D in FIG. 14 is suitable when the latch output is used as the external frame sync signal EXT_FRM_SYNC without any processing.

The phase synchronization circuits B and D according to the foregoing embodiments of the present invention described above can be applied in a similar manner to television signals in a variety of formats shown in FIG. 4, i.e., HD-SDI signals in a variety of formats as well as SD-SDI signals in some formats. With regard to this, while the divide by five counter 5000 is used to generate clocks for measuring a latching position in the circuit of FIG. 3, the division ratio is chosen to be five because the number of dots in one frame of the SDI signals in a variety of formats shown in FIG. 4 can be divided by five without a remainder. Therefore, instead of five, any other arbitrary value can be used as the division ratio as long as the number of dots in one frame can be divided by the value without a remainder. Further, the division ratio may be determined for a particular combination of formats to which the phase synchronization circuit is applied. Furthermore, while the circuit in FIG. 3 employs the frame synchronization signal as the external reference signal, the horizontal synchronization signal may be used from a viewpoint of phase synchronization. Even with this modification, the phase synchronization circuit can be built in a similar circuit configuration.

Figure 15:
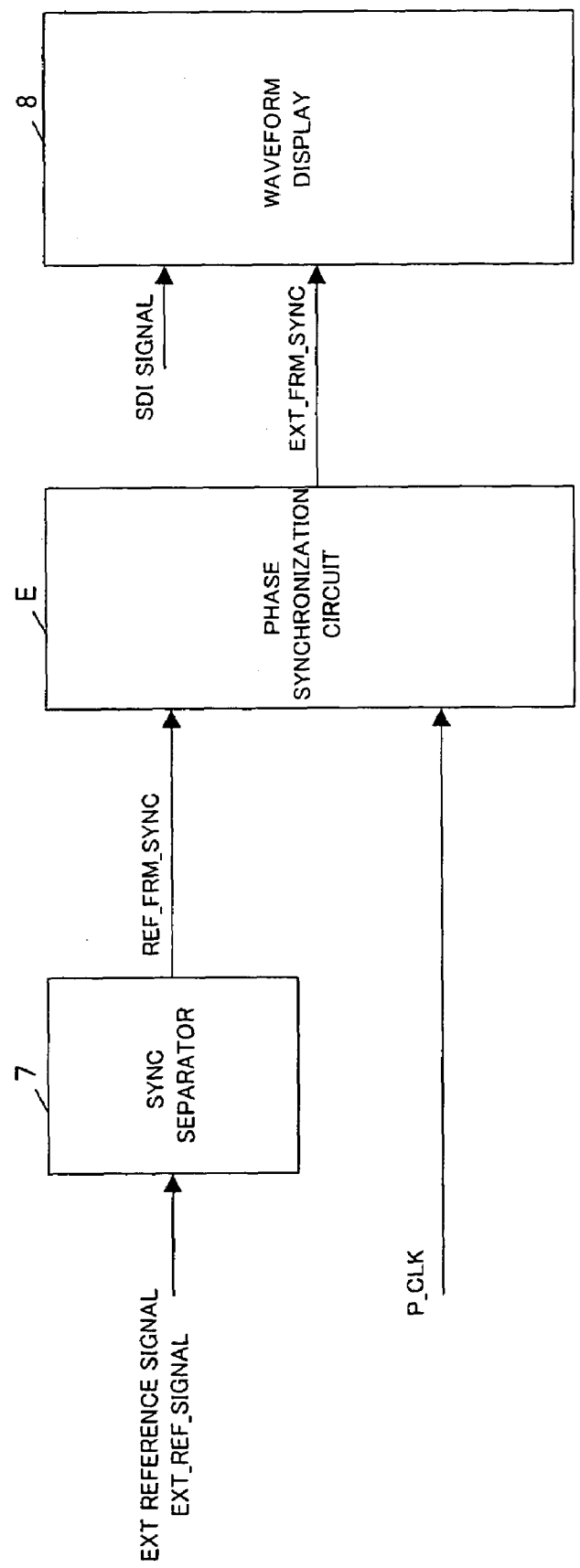
FIG. 15 is a block diagram illustrating a television signal processing apparatus which incorporates the phase synchronization circuit according to one embodiment of the present invention.

Referring next to FIG. 15, description will be made of a television signal processing apparatus F which incorporates a phase synchronization circuit E according to one embodiment of the present invention. As illustrated, the signal processing apparatus F comprises a sync separator 7, the phase synchronization circuit E, and a waveform display 8. The sync separator 7, which has an input for receiving an external reference signal EXT_REF_SIGNAL, separates a reference frame sync signal REF_FRM_SYNC from the received signal EXT_REF_SIGNAL, and delivers the signal REF_FRM_SYNC. The sync separator 7 can be implemented by a conventionally known arbitrary circuit. The phase synchronization circuit E at the next stage, which may be any of the phase synchronization circuits according to the embodiments of the present invention shown in FIGS. 3, 12 and 14, receives the reference frame sync signal REF_FRM_SYNC and a parallel clock P_CLK separated from an SDI signal (television signal, the waveform of which should be displayed), and generates an external frame sync signal EXT_FRM_SYNC at its output in the manner described above. The waveform display 8, which receives the signal EXT_FRM_SYNC, has an input for receiving the SDI signal, the waveform of which should be displayed. In this way, the waveform display 8 displays the waveform of the received SDI signal with reference to the external frame synchronization signal EXT_FRM_SYNC which is in phase synchronization to the SDI signal. As a result, phase jitter can be canceled in the displayed waveform of the SDI signal, and any shift in a time direction can be substantially eliminated in the displayed waveform of the television signal. Examples of the television signal processing apparatus F may include any waveform displays such as a waveform monitor, an oscilloscope, CRT, and the like. Moreover, the present invention can be applied not only to a waveform display but also to any other signal processing apparatuses for processing television signals such as the SDI signal.

Although only some exemplary embodiments of this invention have been described in detail above, those skilled in the art will readily appreciate that the invention is not limited to the precise construction and compositions disclosed herein and that many modifications are possible in the exemplary embodiments without materially departing from the novel teaching and advantages of this invention. Accordingly, all such modifications are intended to be included within the scope of this invention.

What is claimed is:

1. A latching method comprising the steps of:
   latching a first signal in response to a first portion of a second signal to generate a first latch signal, said first portion being one of a rising edge and a falling edge of the second signal, said first and second signals being periodic signals;
   latching said first signal in response to a second portion of said second signal to generate a second latch signal, said second portion being the other of the rising edge and the falling edge of the second signal; and
   selecting one of said first and second latch signals as a latch signal output,
   wherein said step of selecting includes:
      detecting a latching position error in each of said first latch signal and said second latch signal to generate a latch error signal, said step of detecting including detecting a latch error in said first latch signal to generate a first latch error signal, and detecting a latch error in said second latch signal to generate a second latch error signal, and
      selecting one of said first and second latch signals based on said latch error signal,
      wherein each of said step of detecting a latch error in said first latch signal and said step of detecting a latch error in said second latch signal includes:
         receiving an associated latch signal from among said first and second latch signals and using said second signal to generate a latch state signal indicative of the length from a predetermined reference position of said second signal to said latching position of said associated latch signal; and
      comparing said latch state signal for a first periodic portion of said first signal with said latch state signal for a second periodic portion adjacent to said first periodic portion of said first signal to generate a latch error signal in said associated latch signal in accordance with a result of the comparison.

2. A latching method according to claim 1, wherein said step of selecting one of said first and second latch signals based on said latch error signal includes:
   receiving a first said latch error signal associated with said first latch signal and a second said latch error signal associated with said second latch signal to generate a selection signal indicative of a selection of one of said first and second latch signals based on said first latch error signal and said second latch error signal; and
   outputting one of said first and second latch signals based on said selection signal.

3. A latching method according to claim 1, wherein said method is used for establishing phase synchronization of said first signal to said second signal.

4. A latch comprising:
   a first latch circuit that latches a first signal in response to a first portion of a second signal to generate a first latch signal, said first portion being one of a rising edge and a falling edge of the second signal, said first and second signals being periodic signals;
   a second latch circuit that latches said first signal in response to a second portion of said second signal to generate a second latch signal, said second portion being the other of the rising edge and the falling edge of the second signal; and
   a selector circuit that receives said first and second latch signals and selects one of said first and second latch signals as a latch signal output,
   wherein said selector circuit includes:
      a latch error detector that detects a latching position error in each of said first latch signal and said second latch signal to generate a latch error signal, said latch error detector including a first latch error detector that detects a latch error in said first latch signal to generate a first latch error signal, and a second latch error detector that detects a latch error in said second latch signal to generate a second latch error signal, and an optimal output selector circuit that selects one of said first latch signal and said second latch signal based on said latch error signal, wherein each of said first and second latch error detectors includes:

a latch state detector that receives an associated latch signal from among said first and second latch signals and uses said second signal to generate a latch state signal indicative of the length from a predetermined reference position of said second signal to said latching position of said associated latch signal; and a latch state comparator that compares said latch state signal for a first periodic portion of said first signal with said latch state signal for a second periodic portion adjacent to said first periodic portion of said first signal to generate a latch error signal in said associated latch signal in accordance with a result of the comparison.

5. A latch according to claim 4, wherein said latch state detector includes:

a timing generator that receives said associated latch signal to generate a latch state detecting period signal for detecting the latch state; and a reference clock generator that receives said second signal and generates the number of reference clocks occurring from said predetermined reference position of said second signal, and wherein said latch state detector generates a latch state signal indicative of the number of said reference clocks in one said latch state detecting period for one periodic portion of said first signal.

6. A latch according to claim 5, wherein said latch state comparator includes:

a comparator that receives a first said latch state signal for a first of said periodic portion of said first signal, and a second said latch state signal for a second said periodic portion adjacent to said first periodic portion of said first signal and compares said first and second latch state signals with each other to generate said latch error signal.

7. A latch according to claim 6, wherein said optimal output selector circuit includes:

an optimal output decision circuit that receives a first said latch error signal from said first latch error detector and a second said latch error signal from said second error detector and generates a selection signal indicative of a selection of one of said first and second latch signals based on said first and second latch error signals; and a selector that output one of said first and second latch signals as said compensated latch signal based on said selection signal.

8. A latch according to claim 4, wherein said latch is used for establishing phase synchronization of a first signal to a second signal.

\* \* \* \* \*